US010965884B2

(12) United States Patent
Miyazaki

(10) Patent No.: US 10,965,884 B2
(45) Date of Patent: Mar. 30, 2021

(54) HEAD-MOUNTED DISPLAY, DISPLAY CONTROLLING APPARATUS, DISPLAY CONTROLLING METHOD, AND PROGRAM

(71) Applicant: SONY INTERACTIVE ENTERTAINMENT INC., Tokyo (JP)

(72) Inventor: Yoshio Miyazaki, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 18 days.

(21) Appl. No.: 16/462,062

(22) PCT Filed: Nov. 24, 2017

(86) PCT No.: PCT/JP2017/042177
§ 371 (c)(1),
(2) Date: May 17, 2019

(87) PCT Pub. No.: WO2018/101162
PCT Pub. Date: Jun. 7, 2018

(65) Prior Publication Data
US 2019/0335114 A1    Oct. 31, 2019

(30) Foreign Application Priority Data

Dec. 1, 2016  (JP) .............................. JP2016-234158

(51) Int. Cl.
*H04N 7/18*  (2006.01)
*H04N 5/268* (2006.01)
(Continued)

(52) U.S. Cl.
CPC .......... *H04N 5/268* (2013.01); *A63F 13/213* (2014.09); *A63F 13/26* (2014.09); *A63F 13/525* (2014.09);
(Continued)

(58) Field of Classification Search
CPC ...... H04N 5/268; H04N 7/045; H04N 13/239; A63F 13/213; A63F 13/26; A63F 13/525; A63F 13/65; G06F 3/013
(Continued)

(56) References Cited

U.S. PATENT DOCUMENTS

| 2015/0084840 A1* | 3/2015 | Kim ..................... G02B 27/017 345/8 |
| 2016/0063767 A1* | 3/2016 | Lee ....................... G06T 19/006 345/419 |

(Continued)

FOREIGN PATENT DOCUMENTS

| JP | 8-102702 A | 4/1996 |
| JP | 2004-258123 A | 9/2004 |

(Continued)

OTHER PUBLICATIONS

International Preliminary Report on Patentability dated Jun. 4, 2019, from International Application No. PCT/JP2017/042177, 14 sheets.

(Continued)

*Primary Examiner* — Jayanti K Patel
*Assistant Examiner* — Richard B Carter
(74) *Attorney, Agent, or Firm* — Katten Muchin Rosenman LLP

(57) ABSTRACT

The present invention provides a novel head-mounted display on which a video image received through wireless communication at a predetermined frequency is displayed, a display controlling apparatus, a display controlling method, and a program. A video image receiving section (94) receives a video image from an entertainment apparatus (14) through wireless communication at a predetermined frequency. A display controlling section (96) causes the video image received through the wireless communication at the (Continued)

predetermined frequency to be displayed on a display section of an HMD (12) in the case where it is decided that a user mounts the HMD (12). A display controlling section (96) causes a video image acquired by using a method other than reception in the video image receiving section (94) through the wireless communication at the predetermined frequency to be displayed on the display section of the HMD (12) before the video image received by the video image receiving section (94) through the wireless communication at the predetermined frequency is caused to be displayed on the display section of the HMD (12).

8 Claims, 7 Drawing Sheets

(51) Int. Cl.
  *A63F 13/213* (2014.01)
  *A63F 13/26* (2014.01)
  *A63F 13/525* (2014.01)
  *A63F 13/65* (2014.01)
  *G06F 3/01* (2006.01)
  *H04N 7/045* (2006.01)
  *H04N 13/239* (2018.01)

(52) U.S. Cl.
  CPC .............. *A63F 13/65* (2014.09); *G06F 3/013* (2013.01); *H04N 7/045* (2013.01); *H04N 13/239* (2018.05)

(58) Field of Classification Search
  USPC ....................................... 345/8, 419; 348/158
  See application file for complete search history.

(56) References Cited

U.S. PATENT DOCUMENTS

2016/0109703 A1\* 4/2016 Nishizawa ........... G02B 27/017
  345/8
2017/0011555 A1\* 1/2017 Li ............................. G06T 1/60

FOREIGN PATENT DOCUMENTS

| JP | 2005-300730 A | 10/2005 |
| WO | 2012/145556 | 10/2012 |
| WO | 2016/013269 A1 | 1/2016 |

OTHER PUBLICATIONS

International Search Report and Written Opinion dated Feb. 20, 2018, from International Application No. PCT/JP2017/042177, 9 sheets.

\* cited by examiner

HEAD-MOUNTED DISPLAY, DISPLAY CONTROLLING APPARATUS, DISPLAY CONTROLLING METHOD, AND PROGRAM

TECHNICAL FIELD

The present invention relates to a head-mounted display, a display controlling apparatus, a display controlling method, and a program.

BACKGROUND ART

In recent years, a head-mounted display (HMD) has begun to spread. The HMD is a sort of wearable computer, and is a display apparatus which a user mounts on his/her head, and with which the user can appreciate a video image displayed in front of the eyes.

SUMMARY

Technical Problem

The inventor et al. examine that a video image is transmitted to the HMD through wireless communication at a predetermined frequency. For example, it is examined that a video image generated by a game apparatus is transmitted to the HMD in a wireless manner such that the video image is displayed on the HMD.

It is therefore one of objects to provide a novel head-mounted display on which a video image which is received through wireless communication at a predetermined frequency is displayed, a display controlling apparatus, a display controlling method, and a program.

Solution to Problem

In order to solve the problem described above, a head-mounted display according to the present invention includes a predetermined frequency communicating section receiving a video image from a video image transmitting apparatus through wireless communication at a predetermined frequency, a post-mounting video image display controlling section causing the video image received by the predetermined frequency communicating section to be displayed on a display section of the head-mounted display in a case where it is decided that a user mounts the head-mounted display, and a pre-mounting video image display controlling section causing a video image acquired by using a method other than reception by the predetermined frequency communicating section to be displayed on the display section before the video image received by the predetermined frequency communicating section is caused to be displayed on the display section.

In one aspect of the present invention, the pre-mounting video image display controlling section causes a video image which is not transmitted from the video image transmitting apparatus to be displayed on the display section.

In the aspect, the pre-mounting video image display controlling section may cause a video image obtained through photographing by a camera photographing a circumference of the user mounting the head-mounted display to be displayed on the display section.

In addition, in one aspect of the present invention, the pre-mounting video image display controlling section causes a video image received from the video image transmitting apparatus through wireless communication at a frequency different from the predetermined frequency to be displayed.

In addition, in one aspect of the present invention, the predetermined frequency communicating section receives a video image after image processing is executed for the video image obtained through the photographing by the camera photographing the circumference of the user mounting the head-mounted display.

In addition, in one aspect of the present invention, the head-mounted display further includes a line-of-sight detecting section detecting a line-of-sight of the user mounting the head-mounted display, in which the post-mounting video image display controlling section causes the video image received by the predetermined frequency communicating section to be displayed on the display section of the head-mounted display in a case where it is decided that the user mounts the head-mounted display on the basis of a result of the detection.

In addition, a display controlling apparatus according to the present invention includes a predetermined frequency communicating section receiving a video image from a video image transmitting apparatus through wireless communication at a predetermined frequency, a post-mounting video image display controlling section causing the video image received by the predetermined frequency communicating section to be displayed on a display section of a head-mounted display in a case where it is decided that a user mounts the head-mounted display, and a pre-mounting video image display controlling section causing a video image acquired by using a method other than reception by the predetermined frequency communicating section to be displayed on the display section before the video image received by the predetermined frequency communicating section is caused to be displayed on the display section.

In addition, a display controlling method according to the present invention includes a step of receiving a video image from a video image transmitting apparatus through wireless communication at a predetermined frequency, a step of causing the video image received in the reception step to be displayed on a display section of a head-mounted display in a case where it is decided that a user mounts the head-mounted display, and a step of causing a video image acquired by using a method other than reception in the reception step to be displayed on the display section before the video image received in the reception step is caused to be displayed on the display section.

In addition, a program according to the present invention causes a computer to execute a procedure of receiving a video image from a video image transmitting apparatus through wireless communication at a predetermined frequency, a procedure of causing the video image received in the reception procedure to be displayed on a display section of a head-mounted display in a case where it is decided that a user mounts the head-mounted display, and a procedure of causing a video image acquired by using a method other than reception in the reception procedure to be displayed on the display section before the video image received in the reception procedure is caused to be displayed on the display section.

DESCRIPTION OF EMBODIMENT

Hereinafter, an embodiment of the present invention will be described with reference to the drawings.

Figure 1:
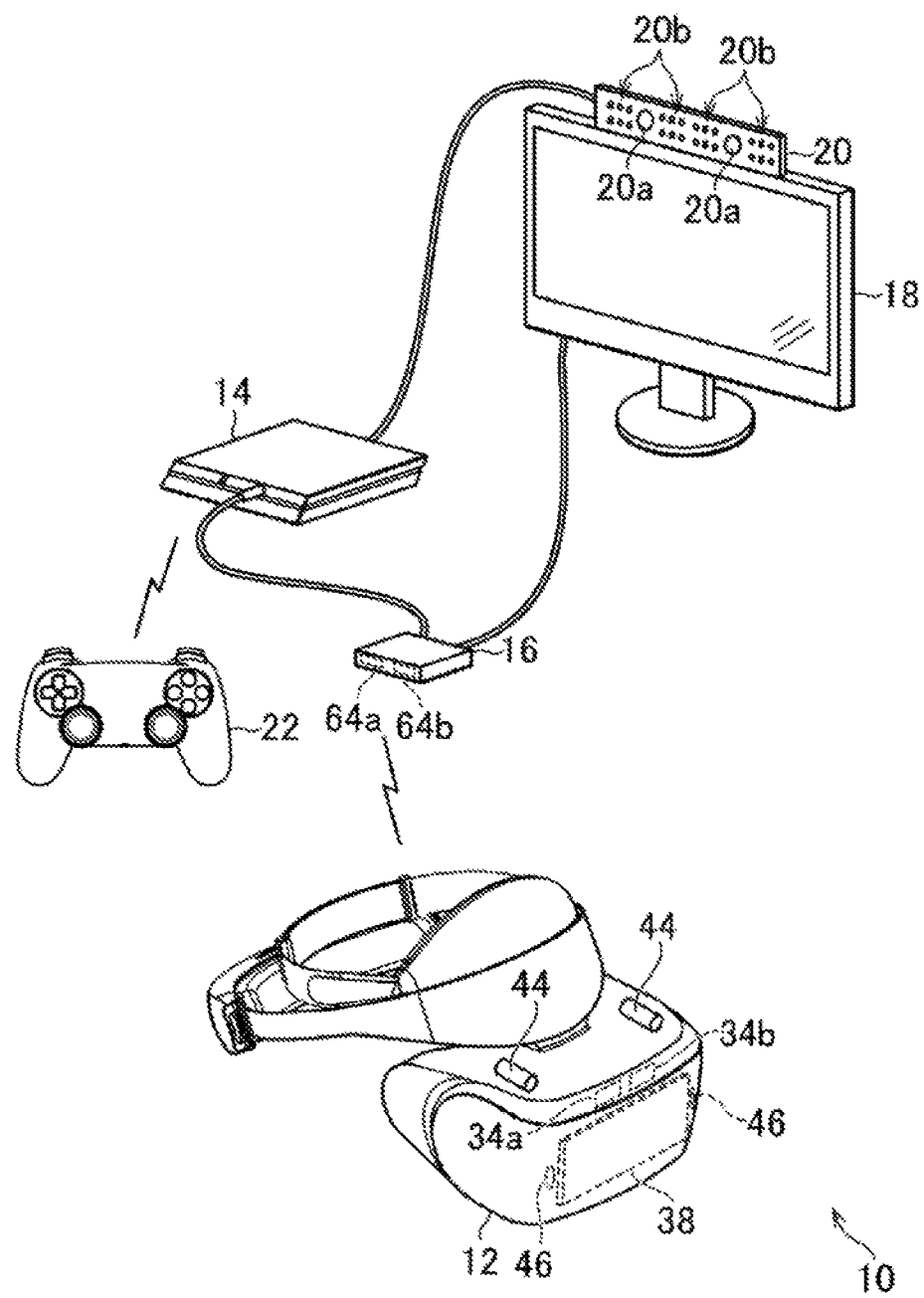
FIG. 1 is a view depicting an example of an entire configuration of an entertainment system according to an embodiment of the present invention.
Figure 2A:
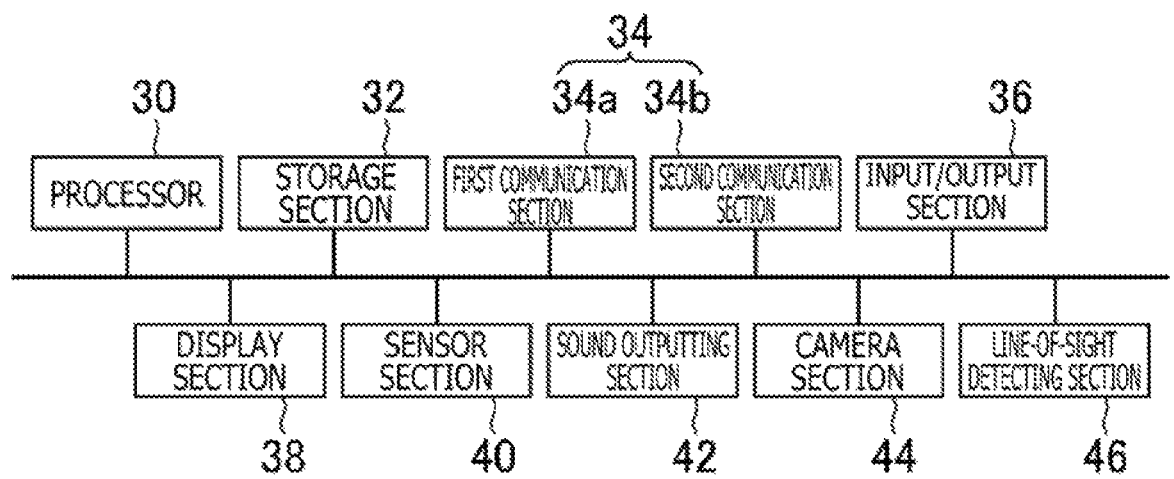
FIG. 2A is a block diagram depicting an example of a configuration of a head-mounted display according to the embodiment of the present invention.
Figure 2B:
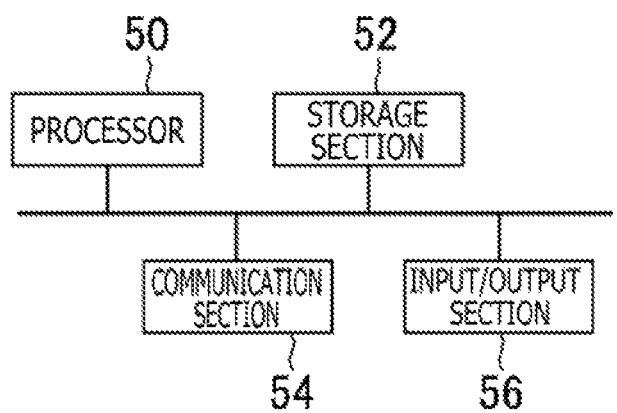
FIG. 2B is a block diagram depicting an example of a configuration of an entertainment apparatus according to the embodiment of the present invention.
Figure 2C:
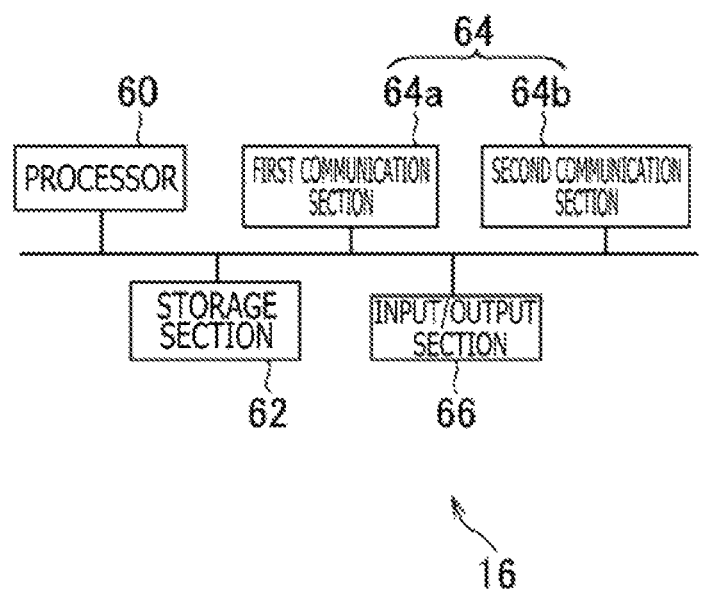
FIG. 2C is a block diagram depicting an example of a configuration of a relay apparatus according to the embodiment of the present invention.

FIG. 1 is a view depicting an example of a configuration of an entire configuration of an entertainment system 10 according to an embodiment of the present invention. FIG. 2A is a block diagram depicting an example of a configuration of a head-mounted display (HMD) 12 according to the embodiment. FIG. 2B is a block diagram depicting an example of a configuration of an entertainment apparatus 14 according to the embodiment. FIG. 2C is a block diagram depicting an example of a configuration of a relay apparatus 16 according to the embodiment.

As depicted in FIG. 1, the entertainment system 10 according to the embodiment includes an HMD 12, an entertainment apparatus 14, a relay apparatus 16, a display 18, a camera microphone unit 20, and a controller 22.

The HMD 12 according to the embodiment, for example, as depicted in FIG. 2A, includes a processor 30, a storage section 32, two communication sections 34 (a first communication section 34a and a second communication section 34b), an input/output section 36, a display section 38, a sensor section 40, a sound outputting section 42, a camera section 44, and a line-of-sight detecting section 46.

The processor 30, for example, is a program control device such as a microprocessor which operates in accordance with a program installed in the HMD 12. It should be noted that the HMD 12 may include a control circuit which can implement processing which is executed by the processor 30 instead of including the processor 30.

The storage section 32, for example, includes a storage element such as a ROM (Read-only Memory) or a RAM (Random Access Memory). The program or the like which is executed by the processor 30 is stored in the storage section 32.

Each of the first communication section 34a and the second communication section 34b, for example, is a communication interface such as a wireless LAN (Local Area Network) module. In the embodiment, as depicted in FIG. 1, the first communication section 34a and the second communication section 34b are arranged on an upper side of the front side of the HMD 12.

In the embodiment, a communication standard of the communication performed by the first communication section 34a is different from that of the communication performed by the second communication section 34b. For example, in the first communication section 34a, the communication in a 60-GHz band is performed, and in the second communication section 34b, the communication in a 5-GHz band or in a 2.5-GHz is performed. Hereinafter, the frequency band used in the communication by the first communication section 34a is referred to as a high-frequency band, and the frequency band used in the communication by the second communication section 34b is referred to as a low-frequency band. Then, the communication in the high-frequency band is higher in communicable maximum rate than the communication in the low-frequency band. In addition, the communication in the high-frequency band is higher in rectilinear propagation property than the communication in the low-frequency band, and is shorter in communicable distance than the communication in the low-frequency band.

The input/output section 36, for example, is an input/output port such as an HDMI (registered trademark) (High-Definition Multimedia Interface) port, a USB (Universal Serial Bus) port, or an AUX (Auxiliary) port.

The display section 38, for example, is a display such as a liquid crystal display or an organic EL (Electro-Luminescence) display which is arranged on a front side of the HMD 12, and is caused to display a video image or the like generated by the entertainment apparatus 14. In addition, the display section 38 is accommodated in a chassis of the HMD 12. The display section 38, for example, may receive a video image signal which is outputted from the entertainment apparatus 14 and is relayed by the relay apparatus 16, and may output video image represented by the video image signal. The display section 38 according to the embodiment, for example, displays thereon an image for a left eye, and an image for a right eye, thereby enabling a three-dimensional image to be displayed. Incidentally, it is sufficient if the display section 38 cannot display the three-dimensional image, but can display only a two-dimensional image.

The sensor section 40 is a sensor such as a motion sensor which, for example, can detect acceleration or angular velocity. The sensor section 40 outputs a result of detection of an amount of rotation, an amount of movement, or the like of the HMD 12 to the processor 30 at a predetermined sampling rate. In addition, the sensor section 40 may include a proximity sensor which can detect that the user mounts the HMD 12.

The sound outputting section 42, for example, is a headphone, a speaker, or the like, and outputs a sound or the like represented by the sound data generated by the entertainment apparatus 14. The sound outputting section 42, for example, receives the sound signal which is outputted from the entertainment apparatus 14 and is relayed by the relay apparatus 16, and outputs a sound represented by the sound signal.

The camera section 44, for example, is a camera such as a digital camera, and photographs a situation of a circumference of the user who mounts the HMD 12 at a predetermined frame rate. As depicted in FIG. 1, two camera sections 44 according to the embodiment are arranged above the display section 38 in such a way that a front of the display section 38 can be photographed by the two camera sections 44. For this reason, the two camera sections 44 according to the embodiment shall be able to photograph the front of the user who mounts the HMD 12. In addition, the camera section 44 according to the embodiment, for example, is a stereo camera provided with a lens which photographs an image for the left eye, and a lens which photographs an image for a right eye.

The line-of-sight detecting section 46 is a sensor which detects a line of sight of the user who mounts the HMD 12. The line-of-sight detecting section 46, for example, is arranged inside the chassis of the HMD 12. In addition, the line-of-sight detecting section 46 may include an infrared camera which detects a line-of-sight direction of the user who mounts the HMD 12.

The entertainment apparatus 14 according to the embodiment, for example, is a computer such as a game console, a DVD (Digital Versatile Disc) player, or a Blu-ray (registered trademark) player. The entertainment apparatus 14 according to the embodiment, for example, generates a video image or a sound by execution of a stored game program, reproduction of contents stored in an optical disc, or the like. Then, the entertainment apparatus 14 according to the embodiment outputs a video image signal representing a video image to be generated or a sound signal representing a sound to be generated to the HMD 12 or the display 18 via the relay apparatus 16.

The entertainment apparatus 14 according to the embodiment, for example, as depicted in FIG. 2B, includes a processor 50, a storage section 52, a communication section 54, and an input/output section 56.

The processor 50, for example, is a program control device such as a CPU (Central Processing Unit) which operates in accordance with a program installed in the entertainment apparatus 14. The processor 50 according to the embodiment includes a GPU (Graphics Processing Unit) which draws the image in a frame buffer on the basis of a graphics command or data supplied from a CPU. It should be noted that the entertainment apparatus 14 may include a control circuit which can implement the processing which is executed by the processor 50 instead of including the processor 50.

The storage section 52, for example, is a storage element such as a ROM or a RAM, or a hard disc drive. A program or the like which is to be executed by the processor 50 is stored in the storage section 52. In addition, an area of the frame buffer in which an image is to be drawn by the GPU is secured in the storage section 52 according to the embodiment.

The communication section 54, for example, is a communication interface or the like such as a wireless LAN module.

The input/output section 56 is an input/output port such as an HDMI port or a USB port.

The relay apparatus 16 according to the embodiment is a computer which relays the video image signal or the sound signal to be outputted from the entertainment apparatus 14 and outputs the video image signal or the sound signal to the HMD 12 or the display 18.

The relay apparatus 16 according to the embodiment, for example, as depicted in FIG. 2C, includes a processor 60, a storage section 62, two communication sections 64 (a first communication section 64a and a second communication section 64b), and an input/output section 66.

The processor 60, for example, is a program control device such as a CPU which operates in accordance with a program installed in the relay apparatus 16. It should be noted that the relay apparatus 16 may include a control circuit which can implement the processing which is to be executed by the processor 60 instead of including the processor 60.

The storage section 62, for example, is a storage element such as a ROM or a RAM. A program or the like which is to be executed by the processor 60 is stored in the storage section 62.

Each of the first communication section 64a and the second communication section 64b, for example, is a communication interface or the like such as a wireless LAN module. In the embodiment, as depicted in FIG. 1, a front side of the relay apparatus 16 is provided with the first communication section 64a and the second communication section 64b.

In the embodiment, a communication standard of the communication performed in the first communication section 64a, and a communication standard of the communication performed in the second communication section 64b are different from each other. For example, the communication in a high-frequency band (for example, a 60-GHz band) is performed in the first communication section 64a, and the communication in a low-frequency band (for example, a 5-GHz band or a 2.4-GHz band) is performed in the second communication section 64b.

The input/output section 66 is an input/output port such as an HDMI port, or a USB port.

The display 18 according to the embodiment, for example, is a liquid crystal display or the like, and causes a video image or the like represented by the video image signal outputted from the entertainment apparatus 14 to be displayed thereon.

The camera microphone unit 20 according to the embodiment includes a camera 20a which outputs data representing a situation of the circumference, of the camera microphone unit 20, such as an image or the like obtained by, for example, photographing a subject to the entertainment apparatus 14. In addition, the camera 20a according to the embodiment is a stereo camera. In addition, the camera microphone unit 20 according to the embodiment includes a microphone 20b which acquires the sound of the circumference, converts the sound of interest into sound data, and outputs the resulting sound data to the entertainment apparatus 14.

The HMD 12 and the relay apparatus 16, for example, can mutually perform the transmission/reception of the data through the wireless communication. The entertainment apparatus 14 and the relay apparatus 16 are connected to each other through, for example, an HDMI cable, a USB cable or the like. The relay apparatus 16 and the display 18 are connected to each other through, for example, an HDMI cable, or the like. The entertainment apparatus 14 and the camera microphone unit 20 are connected to each other through, for example, an AUX cable or the like.

The controller 22 according to the embodiment is a manipulation inputting apparatus which performs manipulation input to the entertainment apparatus 14. The user depresses a direction key or a button with which the controller 22 is provided or inclines a manipulation stick with which the controller 22 is provided, thereby enabling various kinds of manipulation inputs to be performed by using the controller 22. Then, in the embodiment, the controller 22 outputs input data made to correspond to the manipulation input to the entertainment apparatus 14. In addition, the controller 22 according to the embodiment is provided with a USB port. Then, the controller 22 is connected to the entertainment apparatus 14 through a USB cable, thereby enabling the input data to be outputted to the entertainment apparatus 14 in a wired manner. In addition, the controller 22 according to the embodiment is provided with a wireless communication module or the like, and is adapted to output the input data to the entertainment apparatus 14 in a wireless manner.

Figure 3:
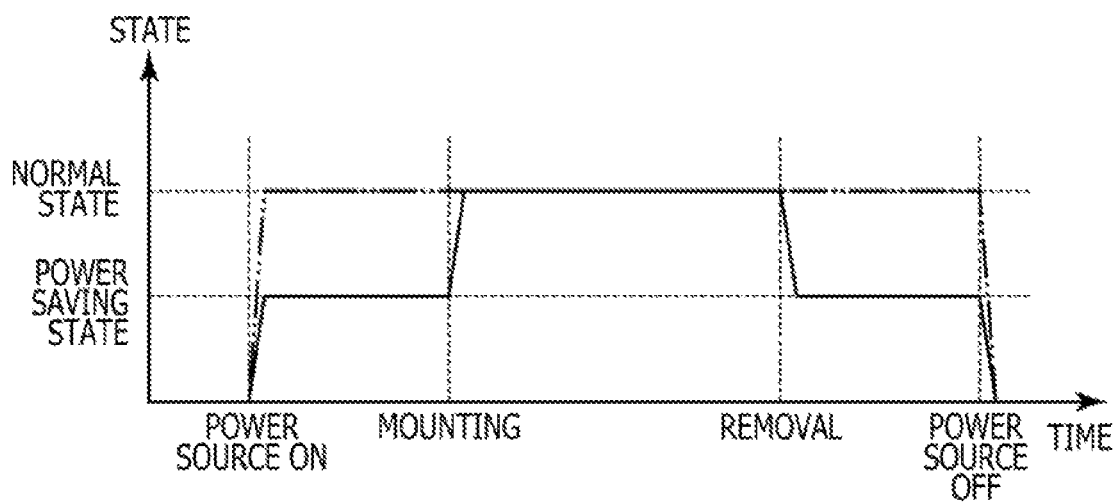
FIG. 3 is an explanatory view schematically depicting an example of an operation of the head-mounted display according to the embodiment of the present invention.

FIG. 3 is explanatory view schematically depicting an example of an operation of the HMD 12 according to the embodiment. FIG. 3 depicts an example of state transition of the first communication section 34a and the second communication section 34b for a period of time ranging from at a time point at which a power source of the HMD 12 is turned ON up to a time point at which the power source of the HMD 12 is turned OFF. In addition, in FIG. 3, an example of the state transition of the first communication section 34a is indicated by a solid line, and an example of the state transition of the second communication section 34b is indicated by a two-dot chain line.

In the embodiment, in the case where the power source of the HMD 12 is held turned ON, or the first communication section 34a operates in either of a normal state or a power saving state. Here, in the embodiment, the power consumption in the HMD 12 is less in the case where the first communication section 34a operates in the power saving state than in the case where the first communication section 34a operates in the normal state.

In the embodiment, for example, the normal state shall mean a state in which the communication is performed between the first communication section 34a and the first communication section 64a. In addition, the power saving state shall mean a state in which, although the electric power is supplied from the power source to the first communication section 34a, no communication is performed between the first communication section 34a and the first communication section 64a.

It should be noted that the normal state and the power saving state are by no means limited to the states described above. For example, the power saving state may mean a state in which, although a link between the first communication section 34a and the first communication section 64a is established, the transmission/reception of the data is not actually performed.

In addition, in the embodiment, in the case where the power source of the HMD 12 is an ON state, the second communication section 34b operates in the normal state. Here, the normal state, for example, shall mean a state in which the communication is performed between the second communication section 34b and the second communication section 64b.

In the entertainment system 10 according to the embodiment, it is decided whether or not the user is in a state in which he/she mounts the HMD 12 on the basis of a physical quantity detected by the sensor section 40, the line-of-sight of the user detected by the line-of-sight detecting section 46, and the like.

For example, in the case where the line-of-sight of the user is detected by the line-of-sight detecting section 46, it may be decided that the user mounts the HMD 12. Alternatively, for example, in the case where it is detected by the line-of-sight detecting section 46 that the line-of-sight direction of the user faces a specific direction, it may be decided that the user mounts the HMD 12. Still alternatively, for example, in the case where it is detected that the line-of-sight direction of the user faces a specific direction over a predetermined time period, it may be decided that the user mounts the HMD 12. In addition, for example, in the case where it is impossible for the line-of-sight detecting section 46 to detect a line-of-sight direction of the user over a predetermined time period, it may be decided that the user removes the HMD 12.

In addition, for example, it may be decided whether or not the user is in the state in which he/she mounts the HMD 12 on the basis of a result of detection of an amount of rotation, and an amount of movement of the HMD 12 which are outputted from the motion sensor included in the sensor section 40.

In addition, for example, when a proximity sensor included in the sensor section 40 detects that a state in which an object comes close to the HMD 12 has elapsed for a predetermined time period or more, it may be decided that the user mounts the HMD 12. In this case, for example, when the proximity sensor included in the sensor 40 detects that a state in which the object does not come close to the HMD 12 has elapsed for a predetermined time period or more, it may be decided that the user removes the HMD 12.

In addition, for example, in a case where the HMD 12 is provided with a mechanism such as a switch, it may be decided whether or not the user is in the state in which he/she mounts the HMD 12 on the basis of a state in which the switch is in an ON or an OFF state. In addition, for example, in the case where the HMD 12 can detect a voice command, it may be decided whether or not the user is in the state in which he/she mounts the HMD 12 on the basis of the voice command.

Then, in the embodiment, in the case where it is decided that the user is in the state in which he/she mounts the HMD 12, the first communication section 34a operates in the normal state. On the other hand, in the case where it is decided that the user is in the state in which he/she does not mount the HMD 12, the first communication section 34a operates in the power saving state.

In the embodiment, for example, as depicted in FIG. 3, when the power source of the HMD 12 is turned ON, the first communication section 34a starts to operate in the power saving state, and the second communication section 34b starts to operate in the normal state. Thereafter, when it is decided that the user mounts the HMD 12, in the embodiment, the state of the first communication section 34a is changed from the power saving state to the normal state. Thereafter, when it is decided that the user removes the HMD 12, in the embodiment, the state of the first communication section 34a is changed from the normal state to the power saving state. Thereafter, when the power source of the HMD 12 is turned OFF, the operations of the first communication section 34a and the second communication section 34b are ended.

Figure 4:
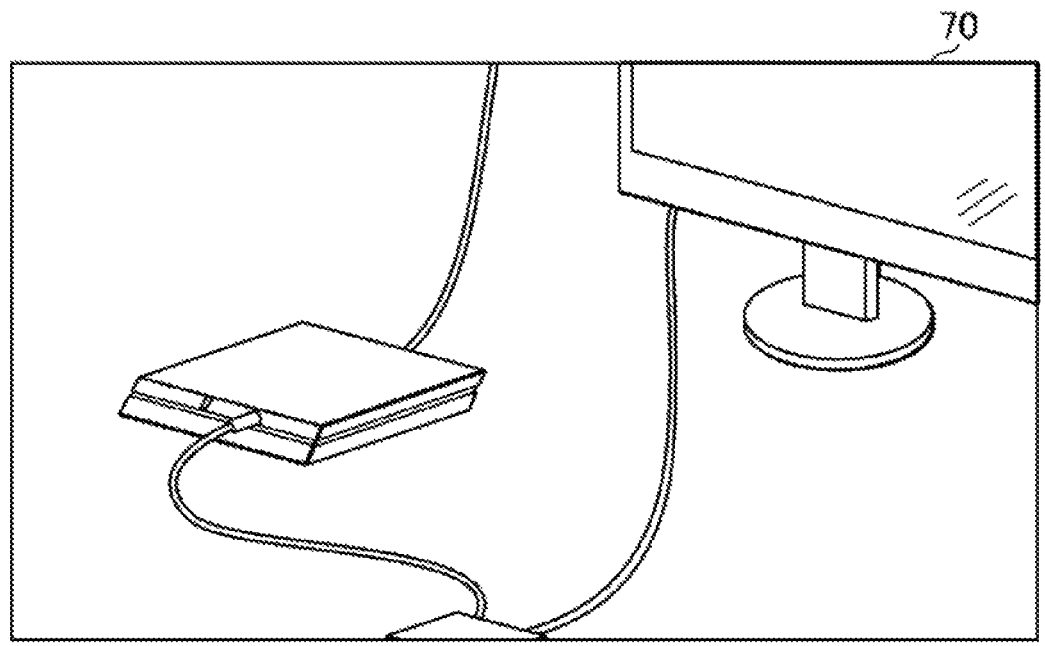
FIG. 4 is a view depicting an image obtained through photographing as an example of a frame image constituting a part of a video image obtained through photographing by a camera section.

Then, in the embodiment, for a period of time for which the first communication section 34a operates in the normal state, for example, the first communication section 34a transmits a video image obtained through photographing at a predetermined frame rate by the camera section 44 to the entertainment apparatus 14 via the first communication section 64a of the relay apparatus 16. FIG. 4 depicts a photographed image 70 as an example of a frame image constituting a part of a video image obtained through photographing by the camera section 44. Then, the entertainment apparatus 14 executes predetermined image processing for the video image of interest. Here, for example, the entertainment apparatus 14 executes the processing or the like for superimposing a virtual object on the image of a subject included in the video image of interest.

Figure 5:
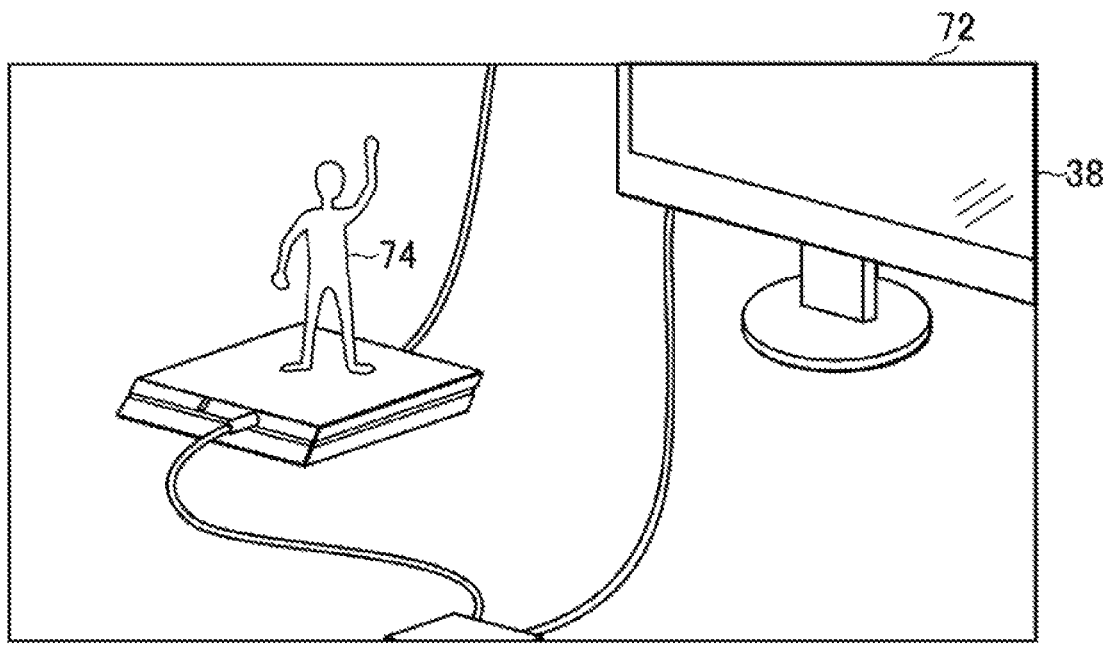
FIG. 5 is a view depicting an example of a situation in which a processed image as an example of a frame image constituting a normal state video image is displayed on a display section.

Then, the entertainment apparatus 14 transmits the video image for which the image processing is executed to the HMD 12 in a communication path via the first communication section 64a of the relay apparatus 12, and the first communication section 34a. Then, the transmitted video image is displayed on the display section 38. Hereinafter, a video image displayed on the display section 38 for a period of time for which the first communication section 34a operates in the normal state will be referred to as a normal state video image. FIG. 5 depicts an example of a situation in which the processed image 72 as an example of the frame image constituting the normal state video image is displayed on the display section 38. In the processed image 72, a virtual object 74 is superimposed on the photographed image 70. For example, in this case, the user who mounts the HMD 12 can appreciate the normal state video image which is obtained by executing the image processing for the video image, representing the situation of the circumference, such as a video image in which the virtual object is superimposed on the video image representing the situation of the circumference.

It should be noted that the image processing which is executed for the video image representing the situation of the circumference is by no means limited to the image processing described above and, for example, image processing such as filtering may be executed.

In addition, the frame rate of the normal state video image, for example, may be 120 fps, 60 fps, or the like.

On the other hand, for a period of time for which the first communication section 34a operates in the power saving state, in the embodiment, for example, the transmission of the video image obtained through the photographing by the camera section 44, or the image processing for the video image of interest is not executed. Then, in the embodiment, even for the period of time for which the first communication section 34a operates in the power saving state, some sort of video image is displayed on the display section 38 of the HMD 12. Hereinafter, a video image which is displayed on the display section 38 for the period of time for which the first communication section 34a operates in the power saving state will be referred to as a power saving state video image. Here, for example, the video image may be displayed as the power saving state video image on the display section 38 without being transmitted to the entertainment apparatus 14.

Figure 6:
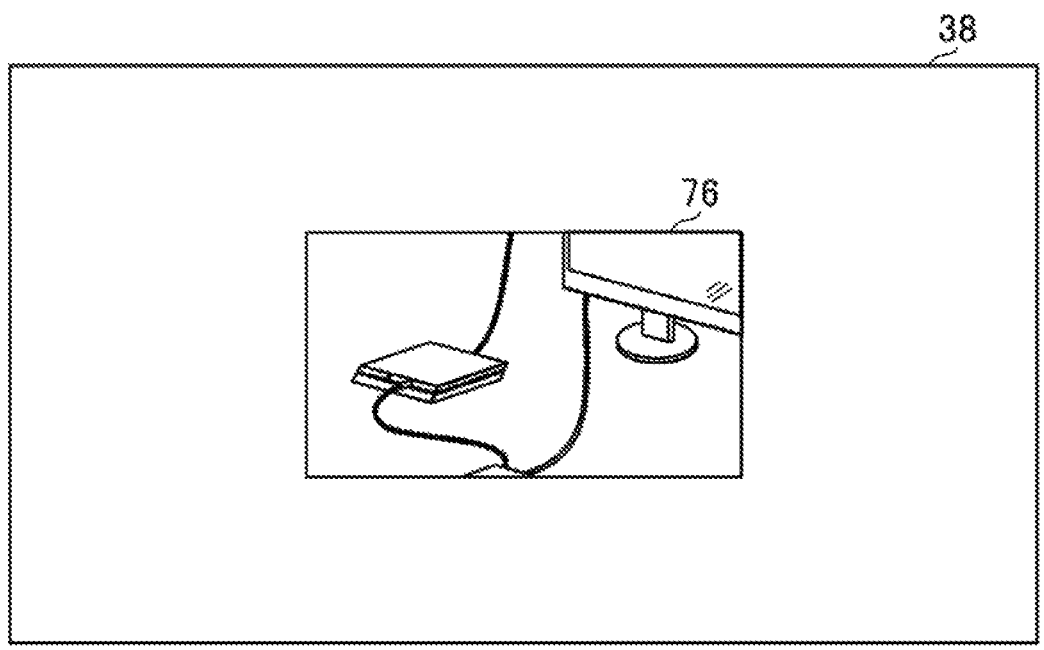
FIG. 6 is a view depicting an example of a situation in which a power saving image as an example of the frame image constituting a power saving state video image is displayed on the display section.

FIG. 6 depicts an example of a situation in which the power saving image 76 as an example of a frame image constituting the power saving state video image is displayed on the display section 38. As depicted in FIG. 6, a size of the frame image constituting the power saving state video image may be smaller than that of the frame image constituting the normal state video image. In addition, for example, the resolution of the frame image constituting the power saving state video image may be lower than that of the frame image constituting the normal state video image.

It should be noted that the power saving state video image may be a video image which is transmitted to the HMD 12 in the communication path via the second communication section 64b and the second communication section 34b. In this case, the power saving state video image of interest may be a video image which is generated by the entertainment apparatus 14 or the relay apparatus 16, or a video image which is stored in the entertainment apparatus 14 or the relay apparatus 16. In addition, for example, the power saving state video image may also be a video image which is stored in the storage section 32 of the HMD 12.

In addition, for example, the power saving state video image may also be a video image which is obtained through photographing by the camera section 44. In this case, the power saving state video image of interest may be displayed on the display section 38 of the HMD 12 without being transmitted to the entertainment apparatus 14 or the relay apparatus 16.

In addition, for example, the frame rate of the power saving state video image may be lower than that of the normal state video image. For example, the frame rate of the power saving state video image may be 30 fps.

Then, in the embodiment, the power consumption of the HMD 12 is less in the case where the power saving state video image is displayed on the display section 38 than in the case where the normal state video image is displayed on the display section 38.

In the manner described above, in the embodiment, even for a period of time for which the first communication section 34a operates in the power saving state, some sort of video image is displayed on the display section 38. For this reason, according to the embodiment, while even when the user does not mount the HMD 12, the video image is caused to be displayed on the HMD 12, the power consumption of the HMD 12 can be suppressed.

In addition, for example, there is present a user who feels anxious if nothing is displayed on the HMD 12 while the mounting of the HMD 12 is completed. According to the embodiment, since, even while the user completes the mounting of the HMD 12, some sort of video image is displayed on the HMD 12, such anxiety of the user is relaxed.

In addition, in the embodiment, the user can readily perform alignment of the HMD 12 with the video image displayed while the user completes the mounting of the HMD 12 in the manner as described above as a clue.

In addition, a position or a direction of the HMD 12 is largely changed while the user completes the mounting of the HMD 12, or the user covers an antenna included in the first communication section 34a with his/her hand, or the like, resulting in that it is feared that the communication link becomes unstable. Therefore, when the video image which is transmitted from the entertainment apparatus 14 through the communication in the high-frequency band is caused to be displayed on the display section 38 even while the user completes the mounting of the HMD 12, it is feared that the video image is fuzzy. In the embodiment, as described above, during the power saving state, the video image which is transmitted from the entertainment apparatus 14 to the HMD 12 through the communication in the high-frequency band is not displayed on the display section 38. For this reason, according to the embodiment, while the user completes the mounting of the HMD 12, the video image can be stably displayed on the HMD 12.

Hereinafter, functions of the HMD 12 and the entertainment apparatus 14 according to the embodiment, and processing executed in the HMD 12 and the entertainment apparatus 14 according to the embodiment will be further described.

Figure 7:
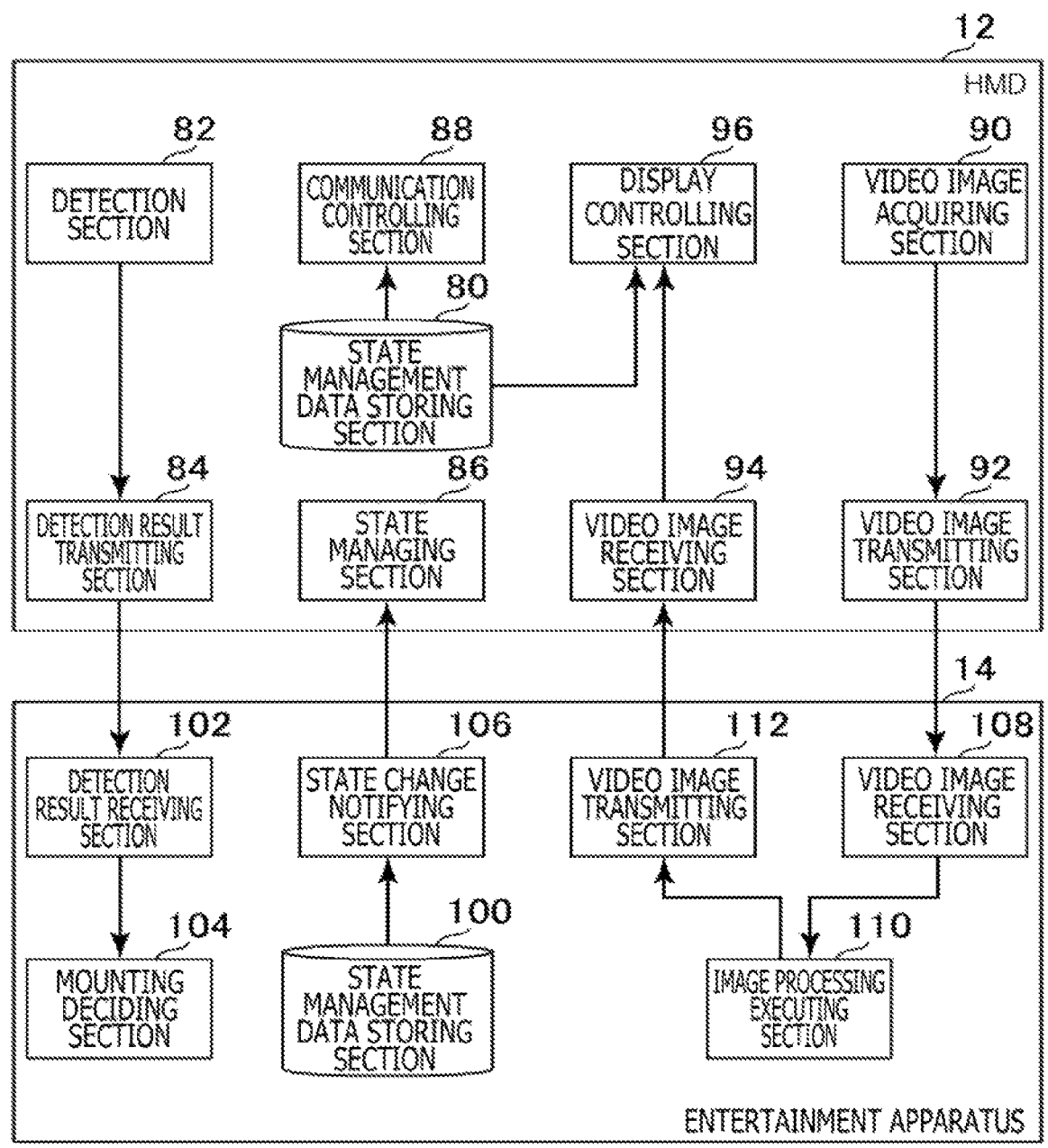
FIG. 7 is a functional block diagram depicting an example of a function mounted to the head-mounted display and the entertainment apparatus according to the embodiment of the present invention.

FIG. 7 is a functional bock diagram depicting an example of the functions which are implemented in the HMD 12 and the entertainment apparatus 14 according to the embodiment. Incidentally, all the functions depicted in FIG. 7 need not to be implemented in the HMD 12 and the entertainment apparatus 14 according to the embodiment. In addition, a function other than the functions depicted in FIG. 7 may be implemented.

As depicted in FIG. 7, the HMD 12 according to the embodiment, in terms of the function, for example, includes a state management data storing section 80, a detection section 82, a detection result transmitting section 84, a state managing section 86, a communication controlling section 88, a video image acquiring section 90, a video image transmitting section 92, a video image receiving section 94, and a display controlling section 96.

The state management data storing section 80 is mainly implemented in the storage section 32. The detection section 82 is mainly implemented in either the sensor section or the line-of-sight detecting section 46. The detection result transmitting section 84 is mainly implemented in the second communication section 34b. The video image transmitting section 92 and the video image receiving section 94 are mainly implemented in the first communication section 34a. The state managing section 86 and the communication controlling section 88 are mainly implemented in the processor 30 and the communication section 34. The video image acquiring section 90 is mainly implemented in the processor 30 and the camera section 44. The display controlling section 96 is mainly implemented in the processor 30 and the display section 38.

The above functions may be implemented by executing a program which is installed in the HMD 12 as the computer and which includes instructions corresponding to the above functions by the processor 30. The program may be supplied to the HMD 12 through a computer-readable information storage medium such as an optical disc, a magnetic disc, a magnetic tape, a magneto-optical disc, or a flash memory, or through the Internet or the like.

In addition, as depicted in FIG. 7, the entertainment apparatus 14 according to the embodiment, in terms of the function, for example, includes a state management data storing section 100, a detection result receiving section 102, a mounting deciding section 104, a state change notifying section 106, a video image receiving section 108, an image processing executing section 110, and a video image transmitting section 112.

The state management data storing section 100 is mainly implemented in the storage section 52. The detection result receiving section 102, the state change notifying section 106, the video image receiving section 108, and the video image transmitting section 112 are mainly implemented in the input/output section 56. The mounting deciding section 104 and the image processing executing section 110 are mainly implemented in the processor 50.

The above functions may be implemented by executing a program which is installed in the entertainment apparatus 14 as the computer and which includes instructions corresponding to the above functions by the processor 50. The program may be supplied to the entertainment apparatus 14 through, for example, a computer-readable information storage medium such as an optical disc, a magnetic disc, a magnetic tape, a magneto-optical disc, or a flash memory, or through, for example, the Internet or the like.

The state management data storing section 80, in the embodiment, for example, stores state management data indicating a state in which the first communication section 34a operates. In this case, for example, when the first communication section 34a operates in the normal state, a value of the state management data shall be set to 1. On the other hand, when the first communication section 34a operates in the power saving state, the value of the state management data shall be set to 0. In addition, in the embodiment, an initial value of the state management data shall be set to 0 when the power source of the HMD 12 is turned ON.

The detection section 82, in the embodiment, for example, detects information used to decide whether or not the user is in the state in which he/she mounts the HMD 12.

The detection result transmitting section 84, in the embodiment, for example, transmits information representing the result of the detection by the detection section 82 to the entertainment apparatus 14 via the relay apparatus 16. In the embodiment, the detection result transmitting section 84 shall transmit the information representing the result of the detection by the detection section 82 in the communication path in the low-frequency band. In addition, the detection result transmitting section 84 may transmit the information representing the newest detection result to the entertainment apparatus 14 at predetermined time intervals.

As described above, for example, the detection section 82 may detect the line-of-sight direction of the user, and the detection result transmitting section 84 may transmit the line-of-sight direction data indicating the line of sight of the user. Incidentally, in this case, the detection result transmitting section 84 may transmit an image obtained by photographing the eyes of the user with an infrared camera or the like.

In addition, as described above, the detection section 82 may detect the amount of rotation, and the amount of movement of the HMD 12, whether or not the proximity sensor and the object come close to each other, whether the switch is in an ON or an OFF state, and so forth. In addition, the detection section 82 may detect the voice command. Then, the detection result transmitting section 84 may transmit data representing these detection results.

The state managing section 86 receives a state change notification which will be described later from the entertainment apparatus 14, and changes the value of the state managing data stored in the state management data storing section 80 in response to the received state change notification. For example, when the state managing section 86 receives the state change notification instructing that the value of the state management data is changed from 0 to 1, the state managing section 86 changes the value of the state management data stored in the state management data storing section 80 to 1. In addition, for example, when the state managing section 86 receives the state change notification instructing that the value of the state management data is changed from 1 to 0, the state managing section 86 changes the value of the state management data stored in the state management data storing section 80 to 0.

The communication controlling section 88, in the embodiment, for example, controls whether or not the communication by the first communication section 34a is performed depending on whether or not it is decided that the user is in the state in which he/she mounts the HMD 12. In addition, the communication controlling section 88 starts to perform the communication by the second communication section 34b in response to the power source of the HMD 12 being turned ON. In addition, the communication controlling section 88 ends the communication by the second communication section 34b in response to the power source of the HMD 12 being turned OFF.

Here, the communication controlling section 88 may control whether or not the communication by the first communication section 34a is performed depending on the value of the state management data stored in the state management data storing section 80. In the case where, for example, the value of the state management data is 1, the communication controlling section 88 may perform the control in such a way that the communication by the first communication section 34*a* is performed. On the other hand, in the case where the value of the state management data is 0, the communication controlling section 88 may perform the control in such a way that the communication by the first communication section 34*a* is not performed.

In addition, the communication controlling section 88 may control whether or not the video image obtained through the photographing by the camera section 44 is transmitted from the HMD 12 to the entertainment apparatus 14 on the basis of the result of the decision by the mounting deciding section 104. For example, in the case where the value of the state management data is 1, the transmission of the video image acquired by a video image acquiring section 90 which will be described later, and the reception of the normal state video image may be performed via the communication path in the high-frequency band. In addition, for example, in the case where the value of the state management data is 0, the transmission of the video image obtained through the photographing by the camera section 44, and the reception of the normal state video image may not be performed via the communication path in the high-frequency band. In addition, depending on a change of the value of the state management data stated in the state management data storing section 80, the communication controlling section 88 may control the first communication section 34*a* in such a way that the first communication section 34*a* operates depending on the value of the state management data after the change.

The video image acquiring section 90 acquires the video image which is obtained through the photographing by the camera section 44, and which represents the situation of the circumference of the user who mounts the HMD 12.

In the embodiment, for example, in the case where the value of the state management data stored in the state management data storing section 80 is 1, the video image transmitting section 92 transmits the video image acquired by the video image acquiring section 90 to the entertainment apparatus 14 via the relay apparatus 16. At this time, the video image transmitting section 92 may transmit the video image in the communication path in the high-frequency band.

The video image receiving section 94, in the embodiment, for example, receives the video image from the entertainment apparatus 14 through the wireless communication at the predetermined frequency (for example, in a high-frequency band). Here, the video image receiving section 94, for example, may receive the video image after the image processing is executed for the video image, obtained through the photographing by the camera section 44, such as the normal state video image described above.

In the embodiment, for example, in the case where it is decided that the user mounts the HMD 12, the display controlling section 96 causes the video image which is received by the video image receiving section 94 through the wireless communication at the predetermined frequency (for example, in the high-frequency band) to be displayed on the display section 38. In addition, in the case where it is decided that the user mounts the HMD 12 on the basis of the result of the detection of the line of sight of the user, the display controlling section 96 may cause the video image which is received from the entertainment apparatus 14 through the wireless communication at the predetermined frequency to be displayed on the display section 38.

In addition, in the embodiment, for example, before the display controlling section 96 causes the video image which is received by the video image receiving section 94 through the wireless communication at the predetermined frequency (for example, in the high-frequency band) to be displayed on the display section 38, the display controlling section 96 causes the video image acquired by using a method other than the reception of interest to be displayed on the display section 38. In this case, the display controlling section 96, for example, may cause the video image which is not transmitted from the entertainment apparatus 14 to be displayed on the display section 38. In addition, the display controlling section 96 may cause the video image obtained through the photographing by the camera section 44 to be displayed on the display section 38. Alternatively, in this case, the video image receiving section 94 may receive the video image which is transmitted from the entertainment apparatus 14 through the wireless communication in the low-frequency band. Then, the display controlling section 96 may cause the video image which is transmitted from the entertainment apparatus 14 through the wireless communication in the low-frequency band to be displayed on the display section 38.

In addition, the display controlling section 96, for example, may control whether the normal state video image which is received from the entertainment apparatus 14 is caused to be displayed on the HMD 12, or the power saving state video image which is obtained through the photographing by the camera section 44 is caused to be displayed on the HMD 12 on the basis of the result of the decision by a mounting deciding section 104 which will be described later. For example, in the case where the value of the state management data is 1, the normal state video image described above may be displayed on the display section 38, while, in the case where the value of the state management data is 0, the power saving state video image described above may be displayed on the display section 38. In addition, the display controlling section 96 may change a display mode of the video image which is displayed on the HMD 12 so as to obtain a display mode responding to the value of the state management data after the change depending on the change of the value of the state management data stored in the state management data storing section 80.

The state management data storing section 100, in the embodiment, for example, stores the state management data indicating the state in which the first communication section 34*a* operates. It should be noted that, in the embodiment, the value of the state management data stored in the state management data storing section 80, and the value of the state management data stored in the state management data storing section 100 shall be synchronized with each other.

The detection result receiving section 102, in the embodiment, for example, receives information which is transmitted by the detection result transmitting section 84, and which represents the result of the detection by the detection section 82.

The mounting deciding section 104, in the embodiment, for example, decides whether or not the user is in the state in which he/she mounts the HMD 12 on the basis of the information which is received by the detection result receiving section 102 and which represents the result of the detection by the detection section 82. Here, whenever the detection result receiving section 102 receives the information representing the result of the detection by the detection section 82, the mounting deciding section 104 may decide whether or not the user is in the state in which he/she mounts the HMD 12. For example, the mounting deciding section 104 may decide whether or not the user is in the state in which he/she mounts the HMD 12 on the basis of information representing the result of the detection which the detection result receiving section 102 has most recently received. In addition, the mounting deciding section 104 may decide whether or not the user is in the state in which he/she mounts the HMD 12 on the basis of the information which has been most recently received by the detection result receiving section 102, and which represents a predetermined number of detection results.

In addition, the mounting deciding section 104, in the embodiment, for example, changes the value of the state management data stored in the state management data storing section 100 depending on the decision result as to whether or not the user is in the state in which he/she mounts the HMD 12 is changed.

Here, the mounting deciding section 104 may decide whether or not the user is in the state in which he/she mounts the HMD 12 on the basis of the detected line of sight of the user. For example, it is assumed that the detection result receiving section 102 receives the line-of-sight direction data described above. In this case, it is assumed that the value of the state management data stored in the state management data storing section 100 is 0, and the line-of-sight direction data received by the detection result receiving section 102 indicates a predetermined direction. In this case, the mounting deciding section 104 may decide that the user is in the state in which he/she mounts the HMD 12, and may change the value of the state management data stored in the state management data storing section 100 to 1. In addition, it is assumed that the value of the state management data stored in the state management data storing section 100 is 1, and the detection result receiving section 102 sequentially receives the line-of-sight direction data indicating that it might be impossible to detect the line-of-sight direction of the user predetermine times. In this case, the mounting deciding section 104 may decide that the user is in the state in which he/she does not mount the HMD 12, and may change the value of the state management data stored in the state management data storing section 100 to 0.

It should be noted that the detection result receiving section 102 may receive the data representing the amount of rotation and the amount of movement of the HMD 12, whether or not the proximity sensor and the object are in a state of coming close to each other, whether the switch is in an ON or an OFF state, the detection of the voice command, and the like, in some cases. In such cases, the mounting deciding section 104 may decide whether or not the user is in the state in which he/she mounts the HMD 12 on the basis of these pieces of data received by the detection result receiving section 102.

Depending on a change of the value of the state management data stored in the state management data storing section 100, the state change notifying section 106, in the embodiment, for example, transmits a state change notification representing that the value of the state management data is changed, to the HMD 12. For example, when the value of the state management data stored in the state management data storing section 100 is changed from 0 to 1, the state change notifying section 106 transmits the state change notification instructing that the value of the state management data is changed from 0 to 1. In addition, for example, when the value of the state management data stored in the state management data storing section 100 is changed from 1 to 0, the state change notifying section 106 transmits a state change notification representing that the value of the state management data is changed from 1 to 0.

The video image receiving section 108, in the embodiment, for example, receives the video image which is transmitted from the video image transmitting section 92. Here, the video image receiving section 108 may receive the video image which is obtained through the photographing by the camera section 44, and which represents the situation of the circumference of the user who mounts the HMD 12.

The image processing executing section 110, in the embodiment, for example, executes predetermined image processing for the video image which is received by the video image receiving section 108. Here, the image processing executing section 110, for example, may execute processing for superimposing a virtual object on the video image which is received by the video image receiving section 108, filtering processing, or the like. In addition, in the case where the value of the state management data stored in the state management data storing section 100 is 1, the image processing executing section 110 may execute the image processing for the video image which is received by the video image receiving section 108.

The video image transmitting section 112, in the embodiment, for example, transmits the video image which is obtained by executing the image processing, by the image processing executing section 110, for the video image which is received by the video image receiving section 108 to the HMD 12 via the relay apparatus 16. In the case where the value of the state management data stored in the state management data storing section 100 is 1, the video image transmitting section 112 may transmit the video image for which the image processing is executed. Here, the video image transmitting section 112 may transmit the video image for which the image processing is executed to the HMD 12 in the communication path via the first communication section 64a and the first communication section 34a.

Figure 8:
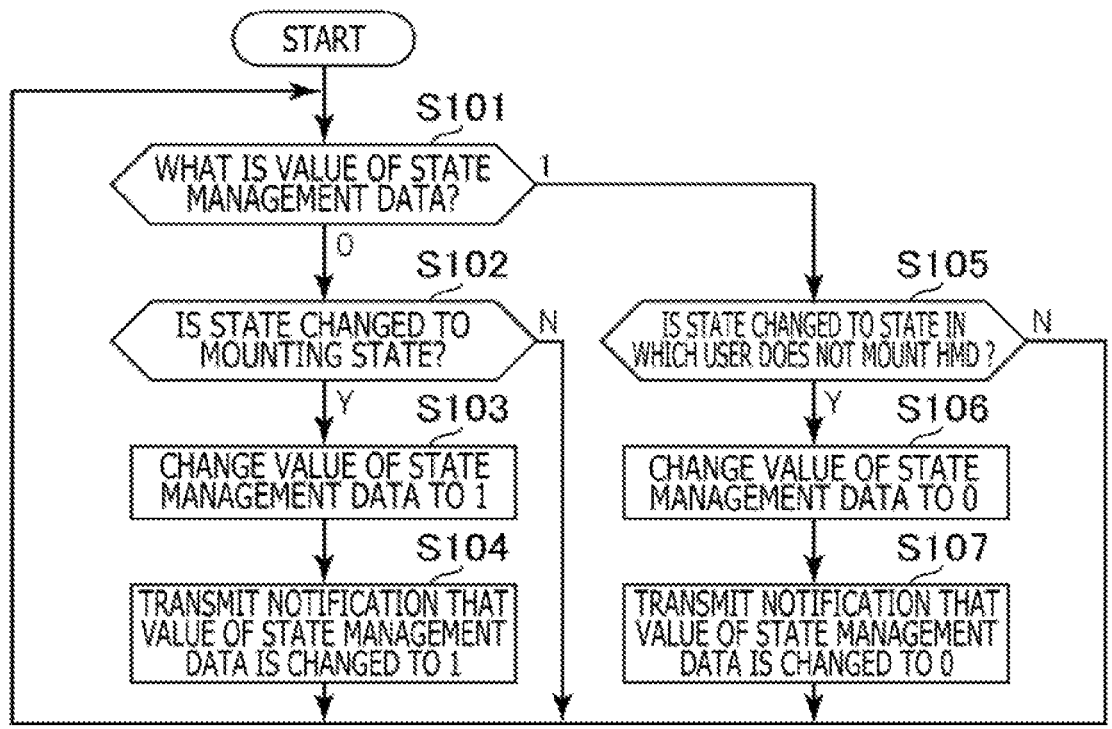
FIG. 8 is a flow chart depicting an example of flow of processing executed in the entertainment apparatus according to the embodiment of the present invention.

Hereinafter, a description will be given with respect to an example of flow of processing, about management of the state of the first communication section 34a, which is based on the line-of-sight direction data received at predetermined time intervals, and which is executed in the entertainment apparatus 14 according to the embodiment with reference to a flow chart exemplified in FIG. 8.

Firstly, when the detection result receiving section 102 receives the line-of-sight direction data, the mounting deciding section 104 confirms the value of the state management data stored in the state management data storing section 100 (S101).

Here, when it is confirmed that the value of the state management data is 0, the mounting deciding section 104 decides whether or not the state is changed to the state in which the user mounts the HMD 12 on the basis of a predetermined number of pieces of line-of-sight direction data which have been most recently received (S102). Here, for example, in the case where the received newest line-of-sight direction data indicates an arbitrary line-of-sight direction, the mounting deciding section 104 may decide that the state is changed to the state in which the user mounts the HMD 12. In addition, for example, in the case where the received newest line-of-sight direction data indicates a specific line-of-sight direction, the mounting deciding section 104 may also decide that the state is changed to the state in which the user mounts the HMD 12. In addition, for example, in the case where any of the predetermined number of pieces of the line-of-sight direction data which have been most recently received indicates a specific line of sight direction, the mounting deciding section 104 may decide that the state is changed to the state in which the user mounts the HMD 12.

When it is not decided in the processing indicated in S102 that the state is changed to the state in which the user mounts the HMD 12 (S102: N), the processing is returned back to the processing indicated in S101.

On the other hand, when it is decided in the processing indicated in S102 that the state is changed to the state in which the user mounts the HMD 12 (S102: Y), the mounting deciding section 104 changes the value of the state management data stored in the state management data storing section 100 to 1 (S103). Then, the state change notifying section 106 transmits the state change notification instructing that the value of the state management data is changed from 0 to 1 to the HMD 12 (S104), and the processing is returned back to the processing indicated in S101.

When it is confirmed in the processing indicated in S101 that the value of the state management data is 1, the mounting deciding section 104 decides whether or not the state is changed to the state in which the user does not mount the HMD 12 on the basis of a predetermined number of pieces of the line-of-sight direction data which have been most recently received (S105). Here, for example, in the case where none of a predetermined number of pieces of the line-of-sight direction data which have been most recently received indicates the line-of-sight direction, the mounting deciding section 104 may decide that the state is changed to the state in which the user does not mount the HMD 12. In the case where it may be impossible to detect that the line-of-sight of the user over the most recently predetermined time in such a manner, it may be decided that the state is changed to the state in which the user does not mount the HMD 12. In addition, for example, in the case where the received newest line-of-sight direction data indicates the specific line-of-sight direction, the mounting deciding section 104 may decide that the state is changed to the state in which the user does not mount the HMD 12.

In the case where it is not decided in the processing indicated in S105 that the state is changed to the state in which the user mounts the HMD 12 (S105: N), the processing is returned back to the processing indicated in S101.

On the other hand, in the case where it is decided in the processing indicated in S105 that the state is changed to the state in which the user mounts the HMD 12 (S105: Y), the mounting deciding section 104 changes the value of the state management data stored in the state management data storing section 100 to 0 (S106). Then, the state change notifying section 106 transmits the state change notification instructing that the value of the state management data is changed from 1 to 0 to the HMD 12 (S107). Then, the processing is returned back to the processing indicated in S101.

In such a manner, in the processing example, whenever the detection result receiving section 102 receives the line-of-sight direction data, the processing indicated from S101 to S107 described above is executed.

Here, the HMD 12 which receives the state change notification transmitted in the processing indicated in S104 changes the value of the state management data stored in the state management data storing section 80 to 1. In this case, the communication controlling section 88 performs the control in such a way that the first communication section 34a operates in the normal state, and the video image acquired by the video image acquiring section 90 is transmitted to the entertainment apparatus 14. In addition, the display controlling section 96 performs the control in such a way that the normal state video image which is received from the entertainment apparatus 14 is displayed on the display section 38.

In addition, the HMD 12 which receives the state change notification transmitted in the processing indicated in S107 changes the value of the state management data stored in the state management data storing section 80 to 0. In this case, the communication controlling section 88 performs the control in such a way that the first communication section 34a operates in the power saving state. In addition, the display controlling section 96 performs the control in such a way that the power saving state video image such as the video image acquired by the video image acquiring section 90 is displayed on the display section 38.

It should be noted that the present invention is by no means limited to the embodiment described above.

Figure 9:
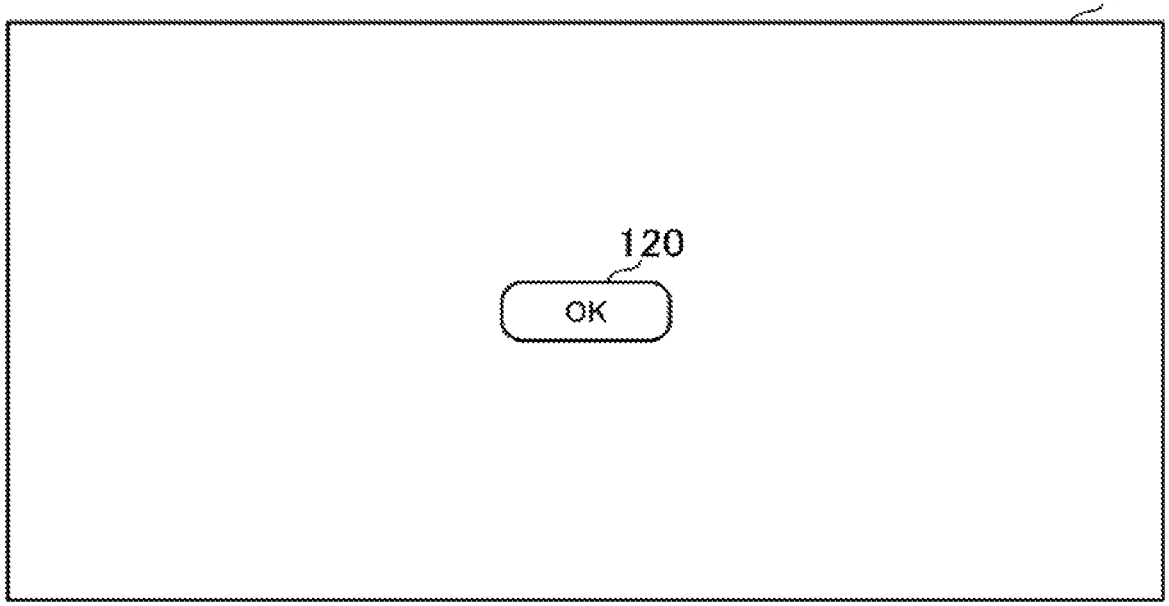
FIG. 9 is a view depicting an example of a situation in which an icon image is displayed on the display section.

For example, in the power saving state, an icon image 120 depicted in FIG. 9 may be displayed on the display section 38. In this case, in the case where the line-of-sight direction data received by the detection result receiving section 102 indicates that a line-of-sight direction is a direction toward the icon image 120, the mounting deciding section 104 may decide that the user mounts the HMD 12. If such a procedure is adopted, the line-of-sight direction in which the state of the first communication section 34a can be changed to the normal state can be guided to the user by using the icon image 120.

In addition, the entertainment apparatus 14 may be provided with the function of the communication controlling section 88 or the display controlling section 96. In this case, for example, the entertainment apparatus 14 may transmit a notification used to control whether or not the video image obtained through the photographing by the camera section 44 is transmitted from the HMD 12 to the HMD 12. Then, the communication controlling section 88 of the HMD 12 may control whether or not the video image obtained through the photographing by the camera section 44 is transmitted from the HMD 12 depending on the notification of interest. In addition, for example, the entertainment apparatus 14 may transmit display mode data indicating the display mode of the video image displayed on the HMD 12 to the HMD 12. Then, the display controlling section 96 of the HMD 12 may perform the control in such a way that the video image is displayed on the HMD 12 in the display mode indicated by the display mode data of interest.

In addition, for example, the HMD 12 may be provided with the functions of the mounting deciding section 104 and the state change notifying section 106, and the entertainment apparatus 14 may be provided with the function of the state managing section 86. In this case, for example, the mounting deciding section 104 of the HMD 12 may decide whether or not the user is in the state in which he/she mounts the HMD 12 on the basis of the information detected by the detection section 82. Then, the mounting deciding section 104 of the HMD 12 may change the value of the state management data stored in the state management data storing section 80 depending on that the result of the decision as to whether or not the user is in the state in which he/she mounts the HMD 12 is changed. Then, when the value of the state management data stored in the state management data storing section 80 of the HMD 12 is changed, the state change notifying section 106 of the HMD 12 may transmit the state change notification to the entertainment apparatus 14.

In addition, part or all of the function of the entertainment apparatus 14 in the above description may be mounted in the relay apparatus 16.

In addition, it may be decided whether or not the user is in the state in which he/she mounts the HMD 12 on the basis of a video image, of a room where the user is present, which is obtained through the photographing by the camera 20*a* of the camera microphone unit 20. In addition, it may be decided whether or not the user is in the state in which he/she mounts the HMD 12 on the basis of the result of the detection by a sensor which is arranged in a room where the user is present, and which can specify a position of the user or a position of the HMD 12.

In addition, the concrete character strings or numerical values described above, and the concrete character strings or numerical values in the drawings are merely exemplifications, and the present invention is by no means limited to these character strings or numerical values.

The invention claimed is:

1. A head-mounted display, comprising:
    a predetermined frequency communicating section receiving a video image from a video image transmitting apparatus through wireless communication at a predetermined frequency;
    a post-mounting video image display controlling section causing the video image received by the predetermined frequency communicating section to be displayed on a display section of the head-mounted display in a case where it is decided that a user mounts the head-mounted display; and
    a pre-mounting video image display controlling section causing a video image acquired by using a method other than reception by the predetermined frequency communicating section to be displayed on the display section before the video image received by the predetermined frequency communicating section is caused to be displayed on the display section.

2. The head-mounted display according to claim 1, wherein the pre-mounting video image display controlling section causes a video image which is not transmitted from the video image transmitting apparatus to be displayed on the display section.

3. The head-mounted display according to claim 2, wherein the pre-mounting video image display controlling section causes a video image obtained through photographing by a camera photographing a circumference of the user mounting the head-mounted display to be displayed on the display section.

4. The head-mounted display according to claim 1, wherein the pre-mounting video image display controlling section causes a video image received from the video image transmitting apparatus through wireless communication at a frequency different from the predetermined frequency to be displayed.

5. The head-mounted display according to claim 1, wherein the predetermined frequency communicating section receives a video image after image processing is executed for the video image obtained through the photographing by the camera photographing the circumference of the user mounting the head-mounted display.

6. The head-mounted display according to claim 1, further comprising:
    a line-of-sight detecting section detecting a line-of-sight of the user mounting the head-mounted display, wherein the post-mounting video image display controlling section causes the video image received by the predetermined frequency communicating section to be displayed on the display section of the head-mounted display in a case where it is decided that the user mounts the head-mounted display on the basis of a result of the detection.

7. A display controlling apparatus, comprising:
    a predetermined frequency communicating section receiving a video image from a video image transmitting apparatus through wireless communication at a predetermined frequency;
    a post-mounting video image display controlling section causing the video image received by the predetermined frequency communicating section to be displayed on a display section of a head-mounted display in a case where it is decided that a user mounts the head-mounted display; and
    a pre-mounting video image display controlling section causing a video image acquired by using a method other than reception by the predetermined frequency communicating section to be displayed on the display section before the video image received by the predetermined frequency communicating section is caused to be displayed on the display section.

8. A display controlling method, comprising:
    receiving a video image from a video image transmitting apparatus through wireless communication at a predetermined frequency;
    causing the video image received in the reception step to be displayed on a display section of a head-mounted display in a case where it is decided that a user mounts the head-mounted display; and
    causing a video image acquired by using a method other than reception in the reception step to be displayed on the display section before the video image received in the reception step is caused to be displayed on the display section.

* * * * *